United States Patent
Austin et al.

(10) Patent No.: US 11,346,707 B2
(45) Date of Patent: May 31, 2022

(54) WEIGH MODULE LOCKOUT ASSEMBLY AND METHOD

(71) Applicants: James A. Austin, Fort Worth, TX (US);
Jeffrey O. Getrum, Fort Worth, TX (US)

(72) Inventors: James A. Austin, Fort Worth, TX (US);
Jeffrey O. Getrum, Fort Worth, TX (US)

(73) Assignee: Cone Craft, LLC, Fort Worth, TX (US)

( * ) Notice: Subject to any disclaimer, the term of this patent is extended or adjusted under 35 U.S.C. 154(b) by 295 days.

(21) Appl. No.: 16/839,584

(22) Filed: Apr. 3, 2020

(65) Prior Publication Data

US 2021/0310854 A1 Oct. 7, 2021

(51) Int. Cl.
*G01G 23/02* (2006.01)
*G01G 21/23* (2006.01)
*G01G 21/24* (2006.01)
*G01G 23/00* (2006.01)

(52) U.S. Cl.
CPC ........... *G01G 23/005* (2013.01); *G01G 21/23* (2013.01); *G01G 23/02* (2013.01); *G01G 21/24* (2013.01)

(58) Field of Classification Search
CPC ...... G01G 23/04; G01G 23/005; G01G 21/23; G01G 21/24
See application file for complete search history.

(56) References Cited

U.S. PATENT DOCUMENTS

| | | | | |
|---|---|---|---|---|
| 3,354,710 | A * | 11/1967 | Johnson | G01L 1/04 177/229 |
| 3,610,353 | A * | 10/1971 | Hocking | G01G 23/02 177/153 |
| 3,773,123 | A * | 11/1973 | Martinez de Castro Lopez | G01G 23/02 177/136 |
| 4,338,825 | A * | 7/1982 | Amlani | G01G 3/1412 73/862.633 |
| 5,923,000 | A * | 7/1999 | Tschopp | G01L 1/26 177/229 |
| 7,166,809 | B2 * | 1/2007 | Desire | G01G 23/02 177/154 |
| 2015/0226601 | A1 * | 8/2015 | Perrea | G01G 23/005 177/145 |

* cited by examiner

*Primary Examiner* — Randy W Gibson
(74) *Attorney, Agent, or Firm* — Dan Brown Law Office; Daniel R Brown (57) ABSTRACT

A lockout assembly for selectively limiting the force applied to a weigh module, with a load cell, that senses force applied to a top plate from an equipment flange. A cowling with a flange spacer, is placed between the top plate and the equipment flange. The cowling has a jack arm that extends laterally and downwardly therefrom, and a jack screw extending downwardly, adjacent a support structure. A jack nut is threaded onto the jack screw, and is adjustable between a lockout position wherein the jack nut engages the support structure, and a weighing position wherein the jack nut does not engage the support structure.

20 Claims, 10 Drawing Sheets

WEIGH MODULE LOCKOUT ASSEMBLY AND METHOD

BACKGROUND OF THE INVENTION

Related Applications

None.

Field of the Invention

The present invention relates to weigh modules. More particularly, the present invention relates to an assembly and method for protecting stain gauge weigh modules from excessive forces.

DESCRIPTION OF THE RELATED ART

Weigh modules, including strain gauge type weigh modules, are utilized in a wide range of industrial and commercial applications. Weigh modules measure static and dynamic forces acting upon them, and provide an electronic signal indicating the weight and/or dynamic forces acting upon them. For example, a liquid tank can be supported upon a plurality of weigh modules, whose output signals are combined to provide an accurate measure of the weight of the tank and its content. By subtracting the tare weight of the tank, the dynamic weight of the tank contents can be monitored, thereby indicating the mass and or volume of the tank contents. Of course, there are many other industrial and commercial weighing applications, as will be appreciated by those skilled in the art.

Weigh modules are designed and specified for a predetermined load range where accuracy is acceptable for each given application. Such weigh modules are also designed and specified for a maximum load, beyond which physical damage to the weigh module is expected. Designers primarily select weigh modules whose accurate load ranges match the requisite measuring needs of each given application. However, over the lives of weigh modules, there may be dynamic events where forces acting on a weigh module exceed its maximum load rating. For example, at the time of installation, as a tank is set upon one or more weigh modules, impact force may exceed the maximum load rating, which can damage or destroy the weigh modules before they are placed into service. At other times, when systems are modified or when service activities in an industrial system take place, or any other manner of extraneous activity, high loads, impact forces, or seismic events, may induce forces and loads that exceed the maximum load ratings, again, damaging the weigh modules.

Manufacturers of weigh modules are known to provide spacers or shims that are installed into their weigh modules at the time of manufacture, which prevent excessive forces from acting upon the structure and strain gauge of such weigh modules, so that they can be reliably installed in typical industrial or commercial settings. Once installed, these spacers and shims are removed so that the dynamic weighing function can commence. While it is possible to retain these spacers and shims for later use, such as for relocation of such weigh modules, experience has shown that this approach is tedious to implement because of the tight tolerances and limited equipment clearances in such weigh modules, which make it difficult to reinstall them without substantial deconstruction of the system within which they are installed. Thus it can be appreciated that there is a need in the art for an assembly and method for protecting weigh modules from excessive loads, which overcome the problems in the prior art.

SUMMARY OF THE INVENTION

The need in the art is addressed by the apparatuses and methods of the present invention. The present disclosure teaches a lockout assembly, for selectively limiting force applied to a weigh module that includes a top plate with a load cell disposed underneath, which senses force applied to the top plate from an equipment flange, and where the weigh module supported by a support structure. The lockout assembly includes a cowling with a flange spacer portion for placement between the top plate and the equipment flange, and that includes a jack arm that extends laterally and downwardly to a jack screw that extends further down from the jack arm adjacent to, but not engaging, the support structure. The assembly also includes a jack nut threaded onto the jack screw, which is adjustable between a lockout position wherein the jack nut engages the support structure, and a weighing position wherein the jack nut does not engage the support structure. While the jack nut is at the lockout position, a first portion of the force applied from the equipment flange is coupled through the cowling, the jack arm, the jack screw, and the jack nut, into the support structure, to thereby limit a second portion of the force coupled through the weigh module, but, when the jack nut is at the weighing position, all of the force applied from the equipment flange is coupled through the weigh module.

In a specific embodiment of the foregoing assembly, the jack nut is configured with an enlarged lower surface area, as compared to a nominal nut size for the jack screw, to decrease the load force per unit of area upon the support structure.

In a specific embodiment, the foregoing assembly further includes an alignment pad located between the jack nut and the support structure, and which has a jack nut alignment opening formed in it to receive and align the jack nut. In a refinement to this embodiment, the alignment pad extends underneath the weigh module to support the weigh module. In a further refinement, the jack nut alignment opening in the alignment pad is selectively positionable to enable the jack screw and the jack nut to be located about either side or either end of the weigh module.

In a specific embodiment, the foregoing lockout assembly further includes a jack washer located under the jack nut and within the jack nut alignment opening in the alignment pad. In a refinement to this embodiment, the jack washer is fabricated from a polymeric material to provide improved lubricity during adjustment of the jack nut.

In a specific embodiment of the foregoing lockout assembly, while at the lockout position, the first portion of the force includes all of the force applied to the top plate, thereby enabling removal of the weigh module while the equipment flange support is maintained.

In a specific embodiment of the foregoing lockout assembly, where the top plate and the equipment flange include plural correspondingly aligned bolt holes, the flange spacer includes plural bolt holes correspondingly aligned with the top plate and the equipment flange, to facilitate assembly thereof with plural bolts.

In a specific embodiment of the foregoing lockout assembly, where the weigh module includes a dead stand with anti lift-off bolt, the jack arm extends laterally to locate the jack screw a sufficient distant to clear the dead stand and anti lift-off bolt. In a refinement to this embodiment, where an item of equipment includes at least three equipment flanges rigidly located with respect to one another, which therefore requires a plurality of aligned weigh modules, the lockout assembly further includes at least two additional lockout assemblies, all correspondingly aligned with the at least three equipment flanges, and the rigidly located at least three equipment flanges accommodate offset load forces between centers of the plurality of weigh modules and corresponding plurality of jacks screws, which are laterally offset by the plurality of jack arms.

In a specific embodiment of the foregoing lockout assembly, the cowling includes a reinforcing flange formed about the flange spacer periphery, which joins with the jack arm, and the jack arm is formed of three side surface joined with the reinforcing flange.

The present disclosure teaches a method of selectively limiting force applied to a weigh module that has a top plate with a load cell underneath, which is supported on a support structure, where the weigh module senses force applied to the top plate from an equipment flange, by using a lockout assembly that includes a cowling with a flange spacer portion, a jack arm extending laterally and downwardly from the cowling, and a jack screw extending downwardly from the jack arm, and a jack nut. The method includes the steps of placing the flange spacer portion of the cowling between the top plate and the equipment flange, thereby aligning the jack screw adjacent to, but not engaging the support structure, and threading the jack nut with the jack screw, and then adjusting the jack nut between a lockout position by engaging the jack nut with the support structure, and a weighing position by disengaging the jack nut from the support structure. When at the lockout position, coupling a first portion of the force applied from the equipment flange through the cowling, the jack arm, the jack screw, and the jack nut, into the support structure, thereby coupling a limited a second portion of the force through the weigh module, and, when at the weighing position, coupling all of the force applied from the equipment flange is through the weigh module.

In a specific embodiment, the foregoing method further includes applying all of the force from the equipment flange, at the lockout position, through the lockout assembly, to facilitate removal of the weigh module while maintaining support of the equipment flange.

In a specific embodiment of the foregoing method, where the top plate and the equipment flange include plural correspondingly aligned bolt holes, the method further includes connecting the flange spacer with the top plate and the equipment flange, using plural correspondingly aligned bolt holes, using plural bolts.

In a specific embodiment of the foregoing method, where the jack nut is configured with an enlarged lower surface area as compared to a nominally sized nut suitable to engage the jack screw, the method further includes the step of decreasing the load force per unit of area upon the support structure using the jack nut with an enlarged lower surface area.

In a specific embodiment, the foregoing method further includes inserting an alignment pad, which has a jack nut alignment opening formed therein, between the jack nut and the support structure, and aligning and receiving the jack nut within the jack nut alignment opening. In a refinement to this embodiment, the method further includes selectively positioning the jack nut alignment opening to enable the jack screw and the jack nut to be position about either side or either end of the weigh module. In another refinement, the method further includes extending the alignment pad underneath the weigh module, to thereby support the weigh module. In yet another refinement, placing a jack washer under the jack nut and within the jack nut alignment opening in the alignment pad.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof, and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present teachings so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Industrial and commercial weigh modules are provided in a wide range of configurations, but do share some common features. Generally speaking, each weigh module comprises a strain gauge, which is a device used to measure strain on an "object". The most common type of strain gauge consists of an insulating flexible backing that supports a metallic foil pattern. The gauge is attached to the "object" by a suitable adhesive. As the "object" is deformed by forces applied to it, the foil is deformed, causing its electrical resistance to change. This resistance change, usually measured in a Wheatstone bridge circuit, is related to the strain by a quantity known as the gauge factor. The "object" is typically a structural member that is deflected by a load impressed upon it. In this disclosure, when reference is made to a "load cell", that is referring to such an "object" with a stain gauge already adhered to it. A further common configuration of a weigh module is the use of a load bearing top plate, unto which an item of equipment is placed so as to induce forces through the top plate and into the load cell with its strain gauge sensing the resultant deflection, and which is located below the top plate. Other components and elements may be added to this basic configuration to form a more complete, or purpose-specific, weigh module, as will be more fully developed hereinafter.

Figure 1:
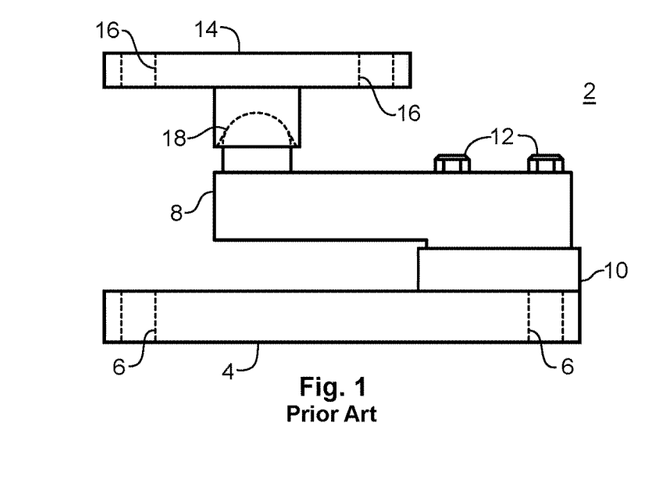
FIG. 1 is a side view drawing of a weigh module according to the prior art.
Figure 2:
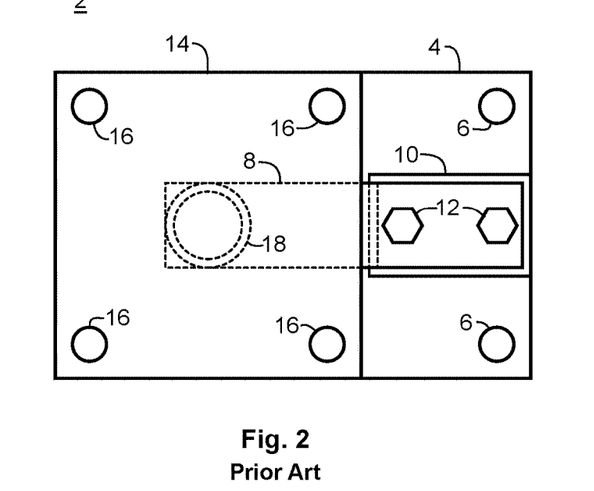
FIG. 2 is a top view drawing of a weigh module according to the prior art.
Figure 3:
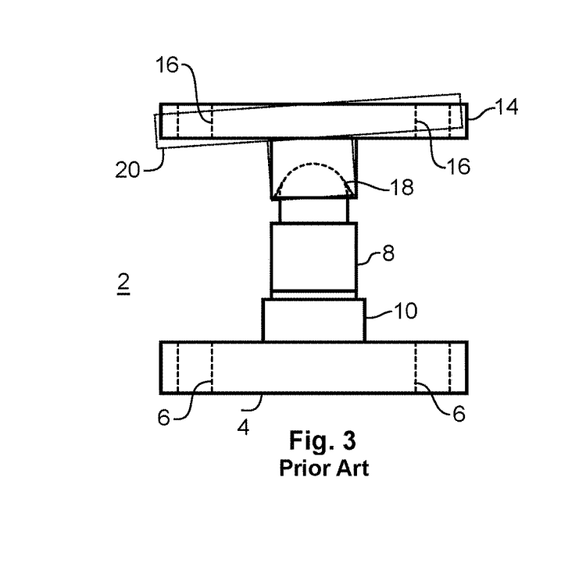
FIG. 3 is an end view drawing of a weigh module according to the prior art.

Reference is directed to FIG. 1, FIG. 2, and FIG. 3, which are side view, top view, and end view drawings, respectively, of a prior art weigh module 2. This weigh module 2 includes a top plate 14 that is connected through a swivel mount 18 to a load cell 8. The load cell 8 is bolted 12 to a base plate 4 thought a spacer mount 10. The base plate 4 has a plurality of bolt holes 6 formed therethrough for rigidly attaching the weigh module 2 to a support surface (not shown), which supports the weigh module 2 and whatever load may be applied to it. Similarly, the top plate 14 has a plurality of bolt holes 16 for attaching an item of equipment (not shown), typically having an equipment flange (not shown) adapted to correspondingly engage the top plate 14 and its bolt holes 16. Note that the swivel mount 18 provides for some planar misalignment 20 of the top plate 14 upper surface with respect to the base plate 4 bottom surface. The weigh module 2 may be fabricated from a variety of suitable materials, as are known to those skilled in the art, and which commonly includes various alloys of stainless steel.

The configuration of weigh module 2 is such that any force applied to the top plate 14 is transferred through the swivel mount 18 and the load cell 8, which acts as a cantilever with attendant bending that is sensed by the strain gauge (not shown). Where the force applied exceeds that bending strength of the load cell 8, failure will occur. When such failure occurs, the strain gauge 8 may shear, resulting in uncontrolled support of whatever equipment (not shown) is being supported, and this action may result in a dangerous situation.

Figure 4:
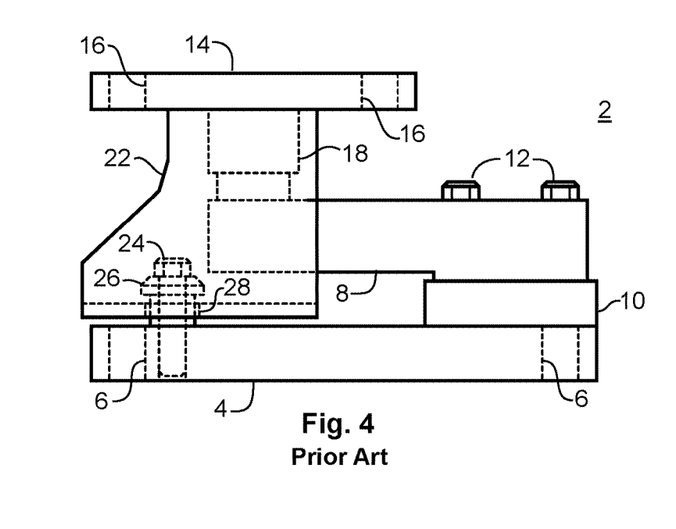
FIG. 4 is a side view drawing of a weigh module according to the prior art.
Figure 5:
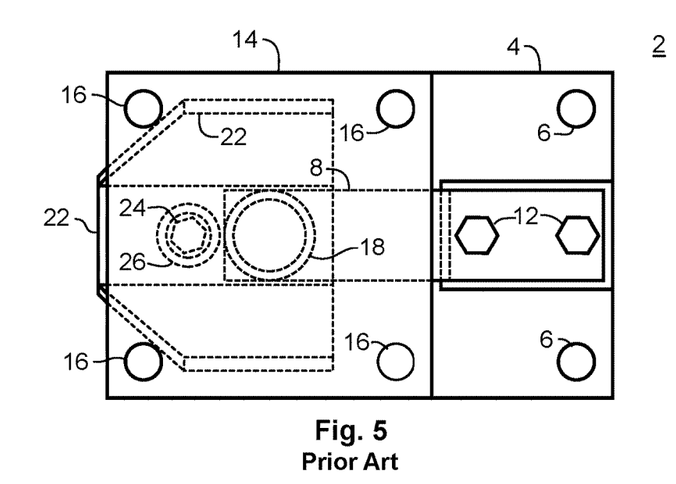
FIG. 5 is a top view drawing of a weigh module according to the prior art.
Figure 6:
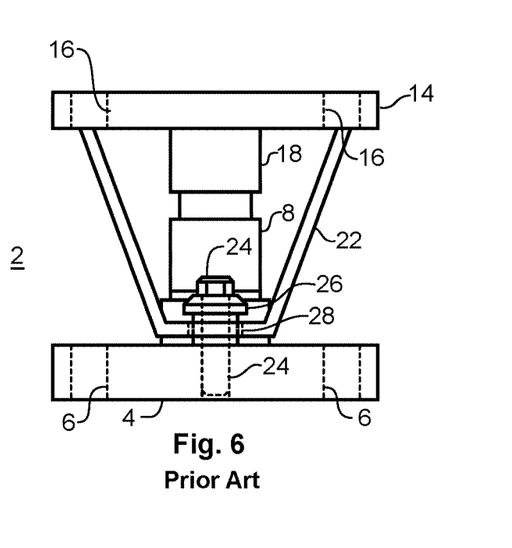
FIG. 6 is an end view drawing of a weigh module according to the prior art.

Reference is directed to FIG. 4, FIG. 5, and FIG. 6, which are side view, top view, and end view drawings, respectively, of a prior art weigh module 2, with an added safety feature. The weigh module 2 of these Figures corresponds with the weigh module 2 in FIGS. 1, 2, and 3. In these FIGS. 4, 5, and 6, a dead stand 22 is added, as illustrated, such as by welding it to the underside of top plate 14. Thusly, if the load cell 8 suffers a complete failure, the dead stand 22 would impact the base plate 4 upper surface, and thereby controllably support whatever load may be applied to the top plate 14, thereby alleviating the aforementioned danger in failure. To prevent the dead stand 22 from moving out of position, an anti lift-off bolt 24 with anti lift-off bushing 26 are provided. The anti lift-off bolt 24 threadably engages the base plate 4. Not that a hole 28 is formed through a lower portion of the dead stand 22, which has a larger diameter than the anti lift-off bushing 26, such that during normal operation the dead stand 22 does not interfere with, nor affect, the operation or accuracy of the weigh module 2. Similarly, note the gap between the base plate 4 upper surface and the dead stand 22 lower surface, as well as the gap between the anti lift-off bushing 26 and the hole 28 in the dead stand 22. It is within these gaps that weigh module suppliers insert spacers (not shown) and shims (not shown) to protect the load cell 8 from excessive forces prior to initiation of normal weighing operations, as discussed hereinbefore. Also note that when a load is applied to top plate 14, there will be a small amount of bending of the load cell 8, which will alter these gaps, making reinsertion of the factory spacers and shims difficult, if not impossible, without removing the loads applied.

The problem with the prior art weigh module 2 is that during actual use, it is sometimes necessary to quickly and easily remove any load seen by the load cell 8, to 'lockout' the weigh module 2, so that any equipment (not shown) mounted to the weigh module 2 may be moved without exerting excessive forces on the load cell 8, which may exceed the capacity of the load cell 8, thereby causing damage. An illustrative embodiment of the present disclosure employs a jacking screw arrangement, where a nut can be easily adjusted to lift the top plate 14 away from the load cell 8, thereby removing any exerted load from the load cell 8.

Figure 7:
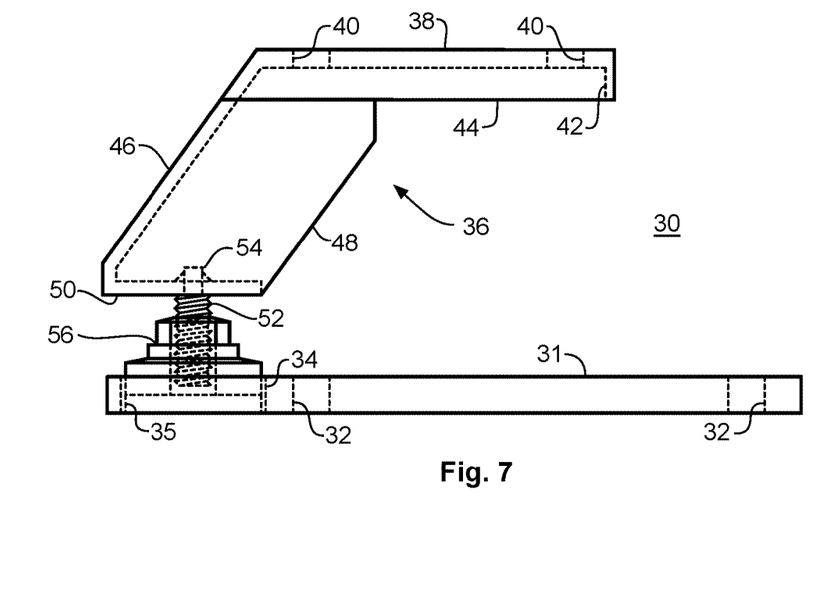
FIG. 7 is a side view drawing of a weigh module lockout assembly according to an illustrative embodiment of the present invention.
Figure 8:
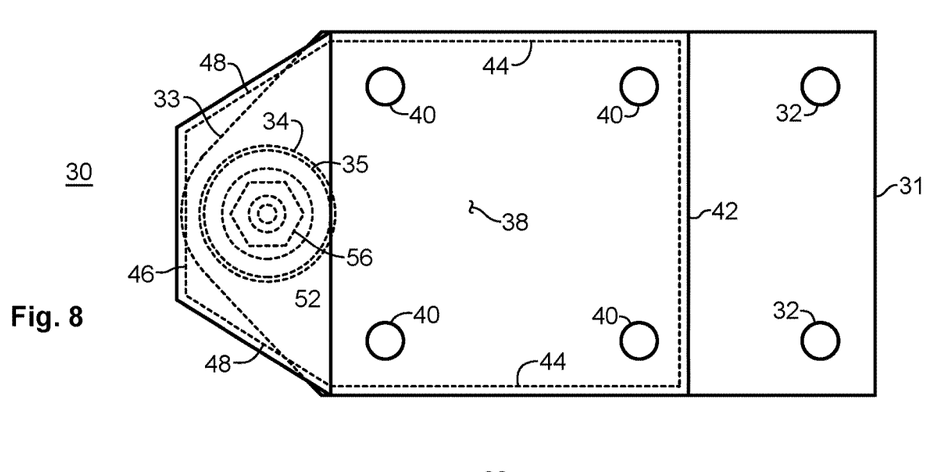
FIG. 8 is a top view drawing of a weigh module lockout assembly according to an illustrative embodiment of the present invention.
Figure 9:
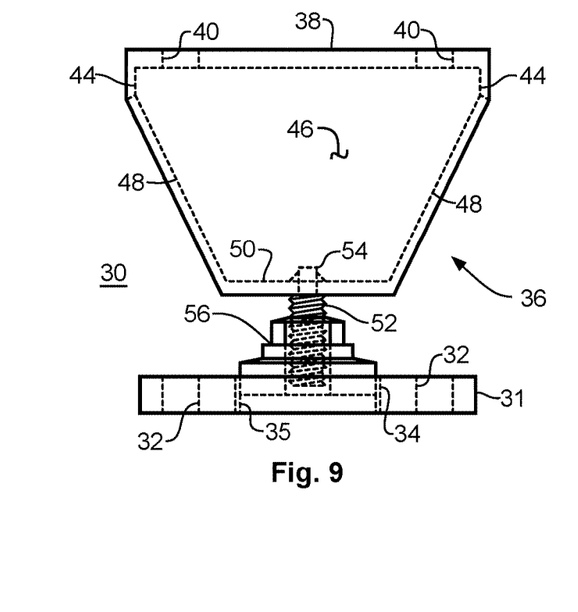
FIG. 9 is an end view drawing of a weigh module lockout assembly according to an illustrative embodiment of the present invention.

Reference is directed to FIG. 7, FIG. 8, and FIG. 9, which are side view, top view, and end view drawings, respectively, of a weigh module lockout assembly 30 according to an illustrative embodiment of the present invention. The lockout assembly includes an alignment pad 31, which has a plurality of bolt holes 32 formed therethrough for attaching a weigh module (not shown) and attachment to a support structure (not shown). One end 33 of the alignment pad 31 has a jack nut alignment opening 34 formed therein for locating and retaining a jack washer 35, and jack nut 56, as illustrated. The lockout assembly 30 benefits by providing that the lock washer 35 is formed from a polymeric material with beneficial lubricity characteristics. In an illustrative embodiment, the jack washer 35 is fabricated from UHMW polyethylene.

The lockout assembly 30 in FIG. 7, FIG. 8, and FIG. 9 also includes cowling 36, which consists of a flange spacer portion 38 partially surrounded by a reinforcing flange 44, 42 about its periphery, generally orthogonal to the flange spacer portion 38 surface. The flange spacer portion 38 has a plurality of bolt holes 40 formed therethrough for attachment to a top plate (not shown) of a weigh module (not shown), and also for attachment to an equipment flange (not shown) in stacked fashion, as will be more fully discussed hereinafter. A jack arm 46 extends laterally and downwardly from the flange spacer portion 38 and terminates at a lower end surface 50, onto which a jack screw 52 is rigidly connected. The jack arm 48 is reinforced by side panels 48 that join with the reinforcing flange 44 to provide a rigid cowling 36 that substantially resists bending from offset loads. This resistance to bending should be substantially greater than the bending strength of the load cell (not shown) of the weigh module (not shown) that the lockout assembly 30 is intended to protect. In the illustrative embodiment, the cowling 36 is fabricated from a stainless steel alloy, although those skilled in the art will appreciate that other structural materials could be employed, depending on the intended application.

The jack screw 52 is rigidly connected to the lower jack arm surface 50 with a stud portion 54 that extends therethrough, and which is filet welded in place for strength. Other suitable attachment techniques could also be employed. In the illustrative embodiment, the jack screw 52 is a stainless steel, having a trapezoidal thread form, such as the common 29° ACME thread profile. A correspondingly threaded jack nut 56 threadably engages the jack screw 52. The jack washer 35 is inserted into the jack nut alignment opening 34 in the alignment pad 31. The jack nut 56 is a single cast unit that has increased area at its base, as compared to a nut that would otherwise fit the jack screw 52, and serves the purpose of increasing the contact area therebetween, and also to facilitate the effectiveness of the aforementioned polymeric material lubricity. In this manner, the jack nut 56 position along the jack screw 52 can be adjusted by rotation thereof to either urged the cowling 36 upwardly or allow it to move downwardly. The benefit of this arrangement will be more fully discussed hereafter. The use of the jack washer 35 is optional, but does provide the benefits generally derived from the use of washers, and serves as a vehicle for the use of a polymeric material and lubricity for ease of operating the jack nut 56.

Figures 10, 12:
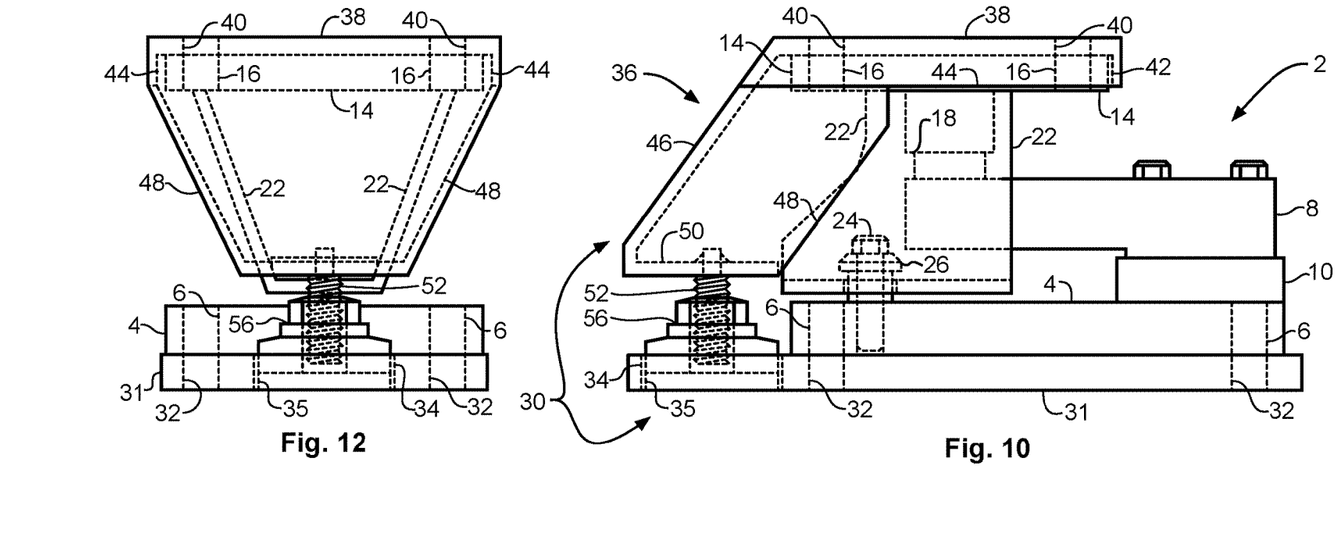
FIG. 10 is a side view drawing of a weigh module lockout assembly according to an illustrative embodiment of the present invention.
FIG. 12 is an end view drawing of a weigh module lockout assembly according to an illustrative embodiment of the present invention.
Figure 11:
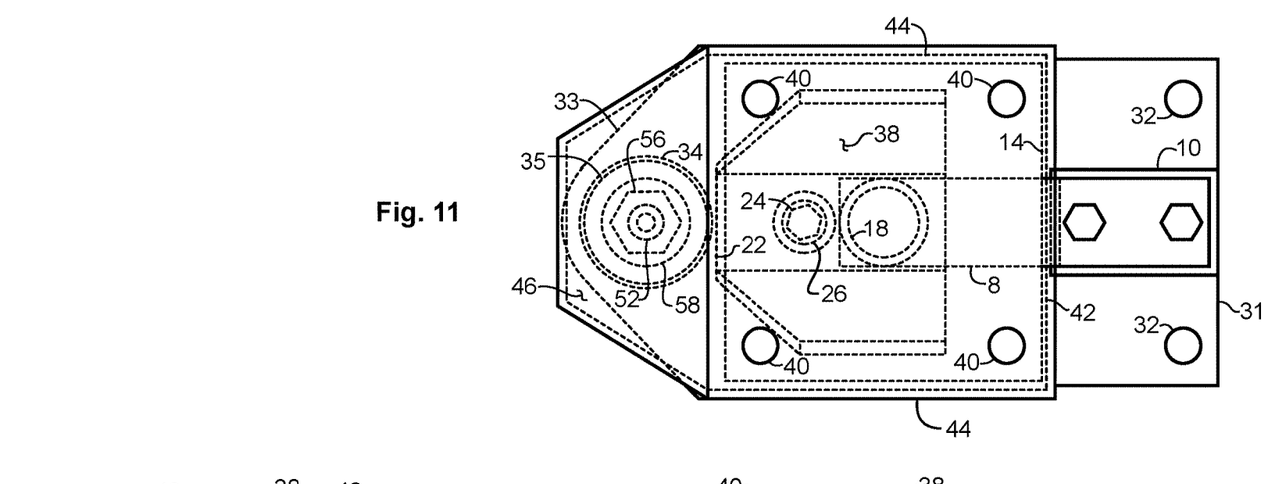
FIG. 11 is a top view drawing of a weigh module lockout assembly according to an illustrative embodiment of the present invention.

Reference is directed to FIG. 10, FIG. 11, and FIG. 12, which are side view, top view, and end view drawings, respectively, of a lockout assembly 30 engaged with a weigh module 2 according to an illustrative embodiment of the present invention. These drawing figures correspond to FIGS. 4 through 7 discussed hereinbefore. By way of review, the weigh module 2 includes the base plate 4 with bolt holes 6, the load cell 8, the swivel mount 18, the top plate 14 with bolt holes 16, the dead stand 22, and the anti lift-off bolt 24 and anti lift-off bushing 26. The lockout assembly 30 includes the alignment pad 31 with bolt holes 32 and jack nut alignment opening 34, the jack washer 35, and the cowling 36. The cowling 36 includes the flange spacer portion 38 with bolt holes 40, the jack arm 46 and related flanges and sides 44, 48, and jack screw 52. The jack nut 56 threadably engages the jack screw 52, and can be selectively engaged with the jack washer 35, if used, or the adjacent support surface (not shown), if not used.

Note in the assembly of FIGS. 10, 11, and 12 that the bolt holes 6 in the base plate 4 of the weigh module 2 align with the bolt holes 32 in the alignment pad 31. In this manner, these two items can be joined together, and also mounted to a support structure (not shown), with a common set of bolts (not shown). Similarly, note that the bolt holes 16 in the top plate 14 of the weigh module 2 align with the bolt holes 40 in the flange spacer 38 portion of the cowling 36. In this manner, these two item can also be joined with a common set of bolts (not shown). Another aspect of note is that the jack arm 46 and its side plates 48 extend downwardly and laterally such that they clear the dead stand 22 of the weigh module 2. This is significant for the purpose of insuring that the lockout assembly 30 does not interfere with movement or operation of the weigh module 2. Also note that the downward extension of the jack arm 46, and the further downward extension of the jack screw 52 are configured so that the lower end of the jack screw 52 does not engage the support surface (not shown) or the jack washer 35 in the jack nut alignment opening 34 in the alignment pad 31. With these arrangements, when the jack nut 56 is moved way from the support surface (not shown) and the jack washer 35, there is no portion of the cowling 36, jack screw 52, or jack nut 52 that engages either the alignment pad 31 or the jack washer 35, and this insures that the weigh module 2 can operation as intended without any interference.

Figure 13:
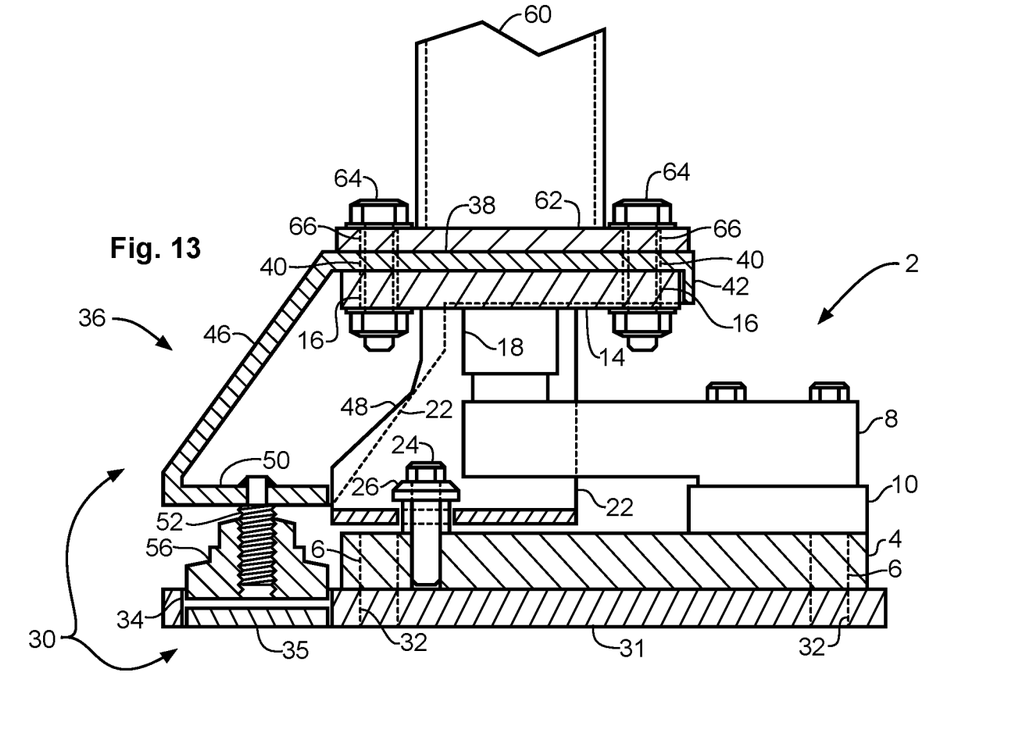
FIG. 13 is a section view drawing of a weigh module lockout assembly supporting process equipment according to an illustrative embodiment of the present invention.
Figure 14:
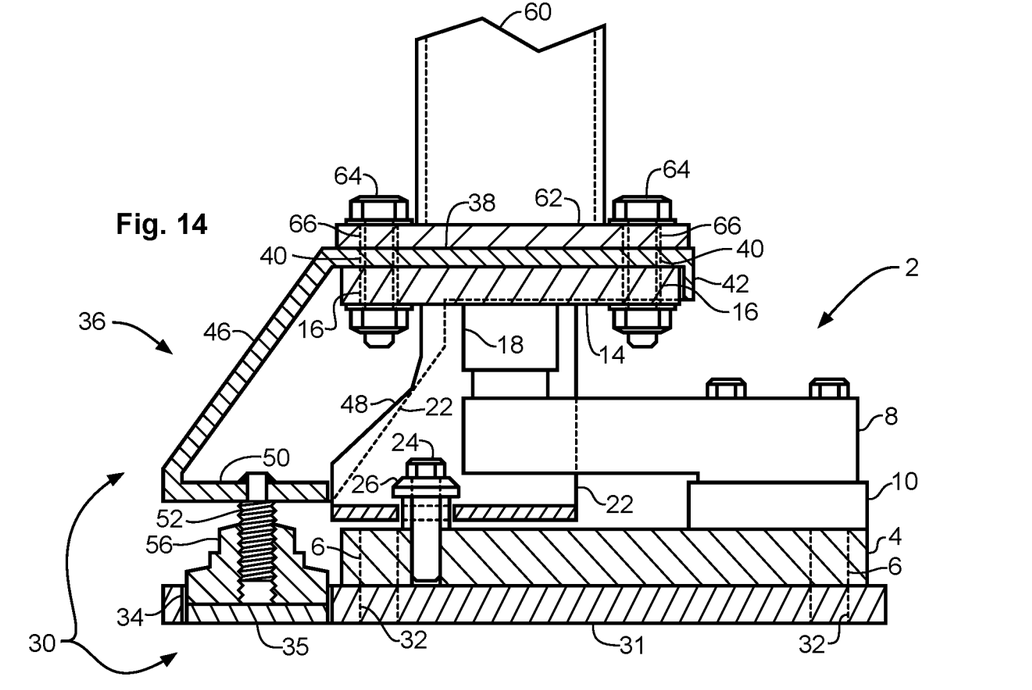
FIG. 14 is a section view drawing of a weigh module lockout assembly supporting process equipment according to an illustrative embodiment of the present invention.

Reference is directed to FIG. 13 and FIG. 14, which are section view drawings of a lockout assembly 30 engaged with a weigh module 2, and supporting process equipment 60, according to an illustrative embodiment of the present invention. These drawing figures correspond to FIGS. 4 through 12 discussed hereinbefore. The difference between the two figures is that FIG. 14 illustrates the jack nut 56 engaged with the jack washer 35, while FIG. 13 illustrates the jack nut 56 disengaged from the jack washer 35. In other embodiments, the jack washer 35 can be omitted, and then the jack nut 56 would directly engage the support surface (not show). Also note that the alignment pad 31 may or may not extend underneath the base plate 4 of the weigh module 2. In FIG. 13. and FIG. 14, an item of equipment 60, which has an equipment flange 62, is bolted 64 together with the flange spacer portion 38 of the cowling 36, and the top plate 14 of the weigh module 2. Note that all three of these members include correspondingly aligned bolt holes 16, 40, and 66, such that a common set of bolts 64 joins them together.

Considering the arrangement illustrated in FIG. 13 and FIG. 14, in operation, when the jack nut 56 is disengaged, as in FIG. 13, then the weigh module 2 operates normally, without any interference from the lockout assembly 30. On the other hand, when the jack nut 56 is engaged, as in FIG. 14, and with sufficient torque applied, then the loads impressed upon the flange spacer portion 38 of the cowling 36 by the equipment flange 62 are transferred through the jack arm 46, the jack screw 52, the jack nut 56, the jack washer 35, and into the support structure (not shown). In this manner, those forces are not borne by the weigh module 2. The extent to which portions of the loads are directed is dependent upon the torque applied to the jack nut 56. The torque can be great enough so that all the force is removed from the weigh module 2, such that the weigh 2 module can be removed altogether, allowing the lockout assembly 30 to carrier the entire load. Note that since the jack screw 52 is laterally offset from the center of the equipment flange 62, a moment of torque will be induced at the equipment flange 62. In practical applications, this moment is resisted by the rigidity of the item of equipment 60, and this is particularly well addressed when there are plural weigh modules and plural lockout assemblies supporting a single item of equipment with plural corresponding equipment flanges.

A review of FIG. 13, where the lock nut 56 is disengaged, discloses that the arrangement of the lockout assembly 30 and the dead stand 22 of the weigh module 2 are such that there is no interference with operation of the load cell 8. The anti lift-off bolt 24 and bushing 26 are clear of the dead stand 22. Likewise, the jack screw 52 and jack nut 56 are clear of the alignment pad 31. And, the jack arm 46 and side walls 48 are clear of the dead stand 22. In this manner, there is no interference with load cell 8 operation until the lock nut 56 is adjusted against the lock pad 58.

Figure 15:
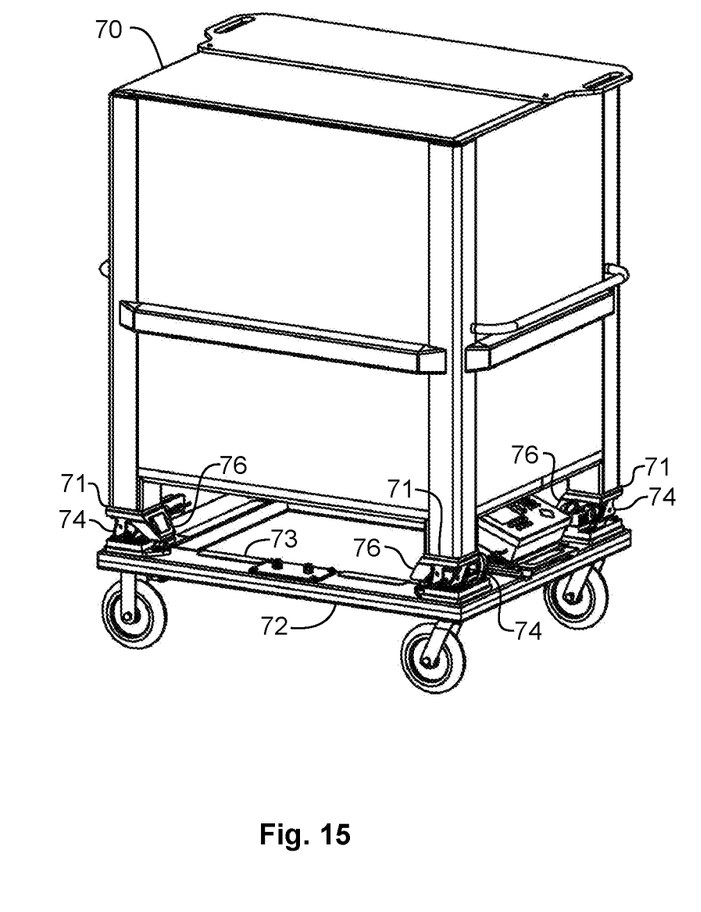
FIG. 15 is a perspective view drawing of process equipment supported by plural weigh modules with lockout assemblies according to an illustrative embodiment of the present invention.
Figure 16:
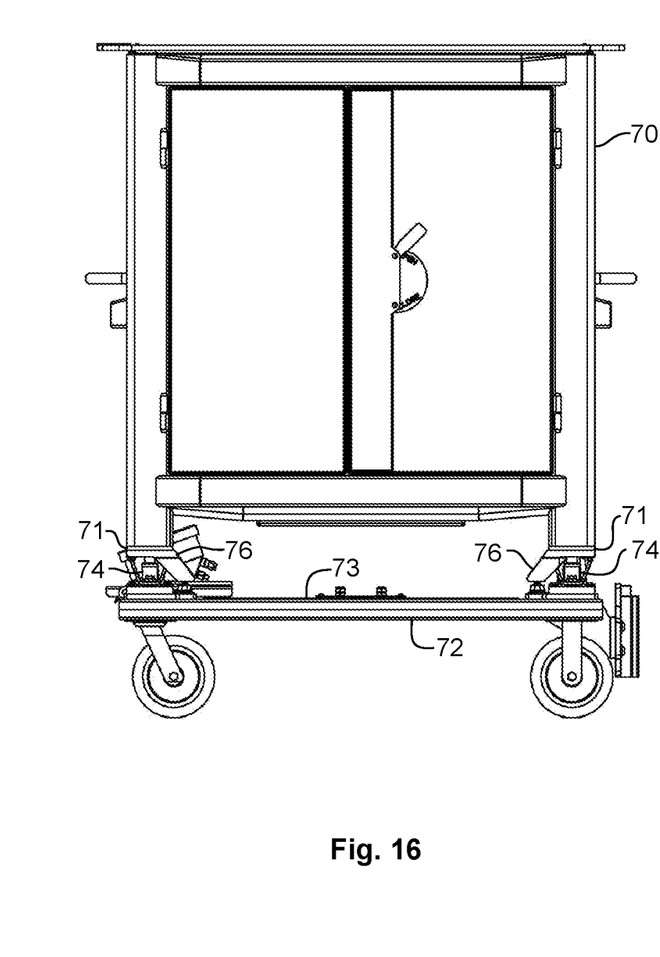
FIG. 16 is a front view drawing of process equipment supported by plural weigh modules with lock-out assemblies according to an illustrative embodiment of the present invention.

Reference is directed to FIG. 15 and FIG. 16, which are perspective view and front view drawings, respectively, of process equipment 70 supported by plural weigh modules 74 with plural corresponding lockout assemblies 76 according to an illustrative embodiment of the present invention. This embodiment illustrates how plural assemblies function cooperatively to weigh and support a single item of equipment 70. In this embodiment, the item of equipment is a liquid bag enclosure 70 used in pharmaceutical manufacturing and processing. At the lower end of the equipment 70 are four equipment flanges 71 (only three are visible), which engage four corresponding lock-out assemblies 76 engaged with four weigh modules 74. The weigh modules 74 are supported on an upper surface 73 of a roller dolly 72 to facilitate movement of the equipment 70 about a production facility. During such movement, excessive forces may be encountered, and to avoid damage from excessive force, the lockout assemblies 76 are engaged to protect the weigh modules 74.

Figure 17:
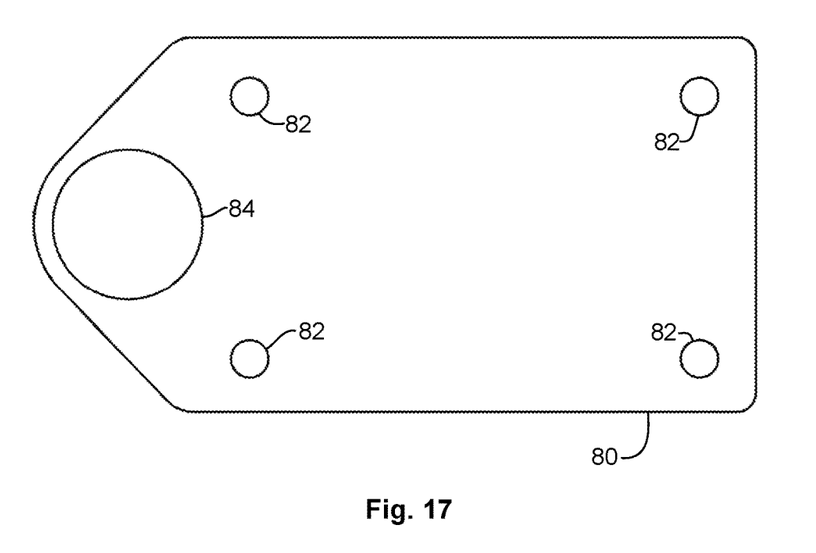
FIG. 17 is a top view drawing of a lockout base according to an illustrative embodiment of the present invention.
Figure 18:
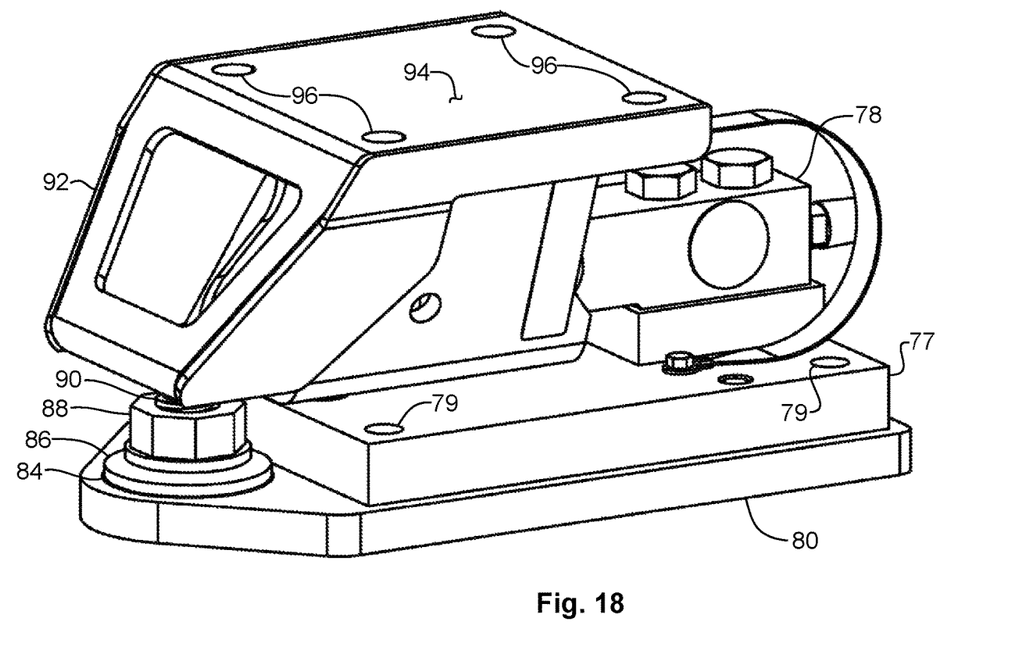
FIG. 18 is a perspective view drawing of a lockout assembly engaged with a weigh module according to an illustrative embodiment of the present invention.

Reference is directed to FIG. 17, which is a top view drawing of a alignment pad 80 according to an illustrative embodiment of the present invention. This alignment pad 80 comprises plural bolt holes 82 and an alignment pad recess 84 located off one end of the alignment pad 80. Note that this alignment pad 80 can be rotated a half-turn to locate the recess 84 off the opposite end. Now reference FIG. 18, which is a perspective view drawing of a lockout assembly engaged with a weigh module 78 and positioned on the alignment pad 80 of FIG. 17. In FIG. 18, note that the weigh module 78 base plate 77 has plural bolt holes 79 that correspondingly align with the bolt holes 82 in the alignment pad 80. The flange spacer 94 is positioned on top of the weigh module 78, and includes plural bolt holes 96, as in the previously described embodiments. A jack arm 92 extends laterally and downwardly from the flange spacer 94, and has a jack screw 90 extending downwardly therefrom. A jack nut 88 threadably engages the jack screw 90, and engages a jack nut 86, which is located in the recess 84 of the alignment pad 80. With this arrangement, the lateral extension of the assembly can be located at either end of the weigh module 78.

Figure 19:
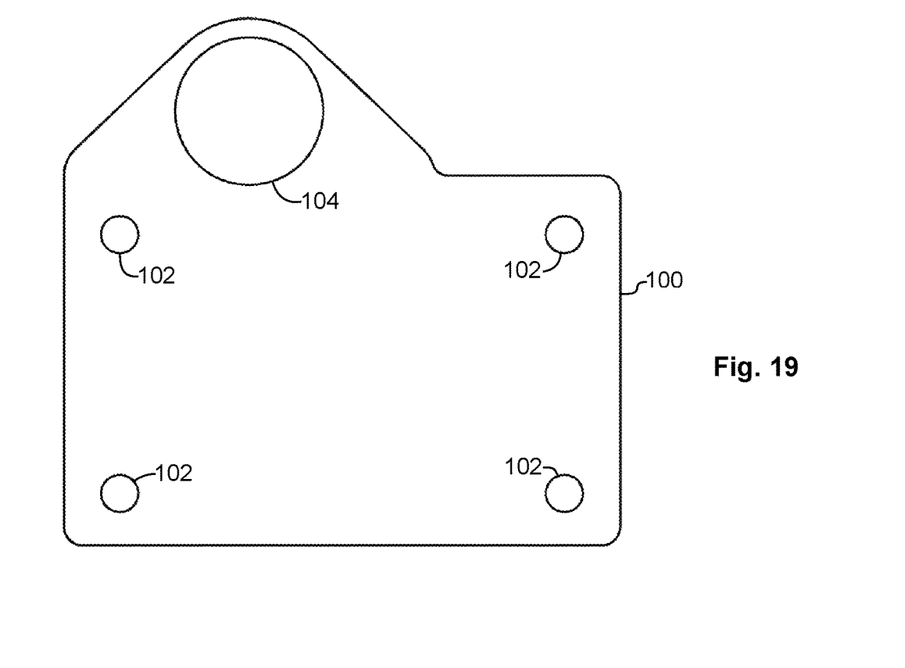
FIG. 19 is a top view drawing of a lockout base according to an illustrative embodiment of the present invention.
Figure 20:
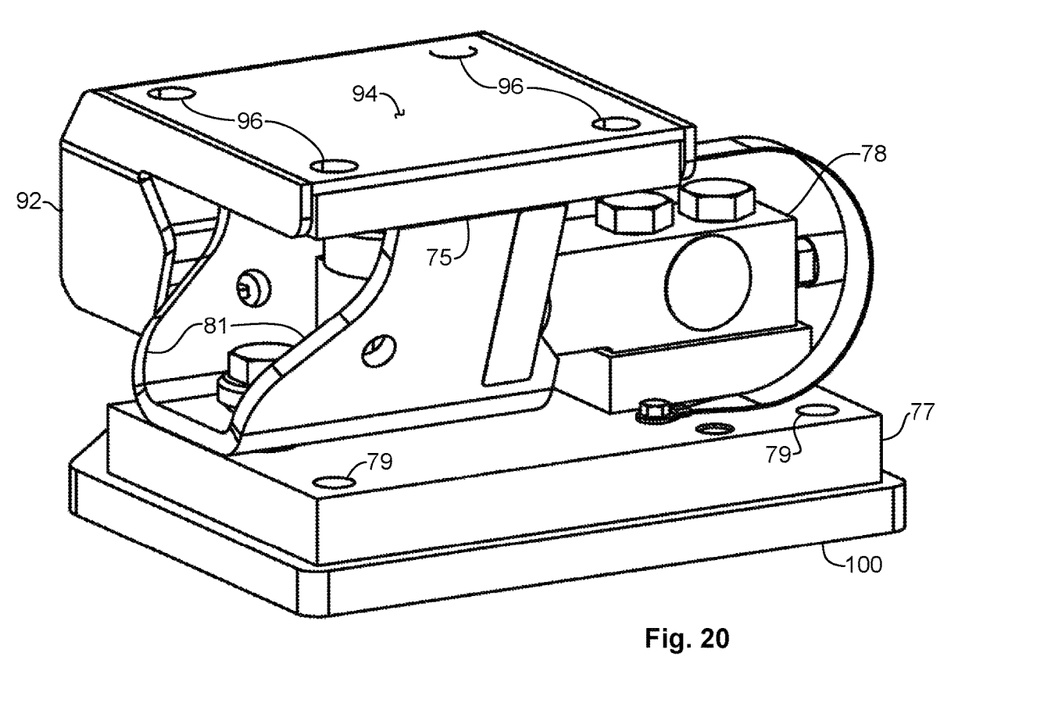
FIG. 20 is a perspective view drawing of a lockout assembly engaged with a weigh module according to an illustrative embodiment of the present invention.

Reference is directed to FIG. 19, which is a top view drawing of an alignment pad 100 according to an illustrative embodiment of the present invention. This alignment pad 100 comprises plural bolt holes 102 and an alignment pad recess 104 located off a first side of the alignment pad 100. Now reference FIG. 20, which is a perspective view drawing of a lockout assembly engaged with a weigh module 78 and positioned on the alignment pad 100 of FIG. 19. In FIG. 20, note that the weigh module 78 base plate 77 has plural bolt holes 79 that correspondingly align with the bolt holes 102 in the alignment pad 100. The flange spacer 94 is positioned on top of the weigh module 78 top plate 75, and includes plural bolt holes 96, as in the previously described embodiments. A jack arm 92 extends laterally and downwardly from the flange spacer 94, as in the prior embodiments. The weigh module 78 dead stand 81 can be seen under the flange spacer 94. With this arrangement, the lateral extension of the assembly can be located on said first side, as illustrated.

Figure 21:
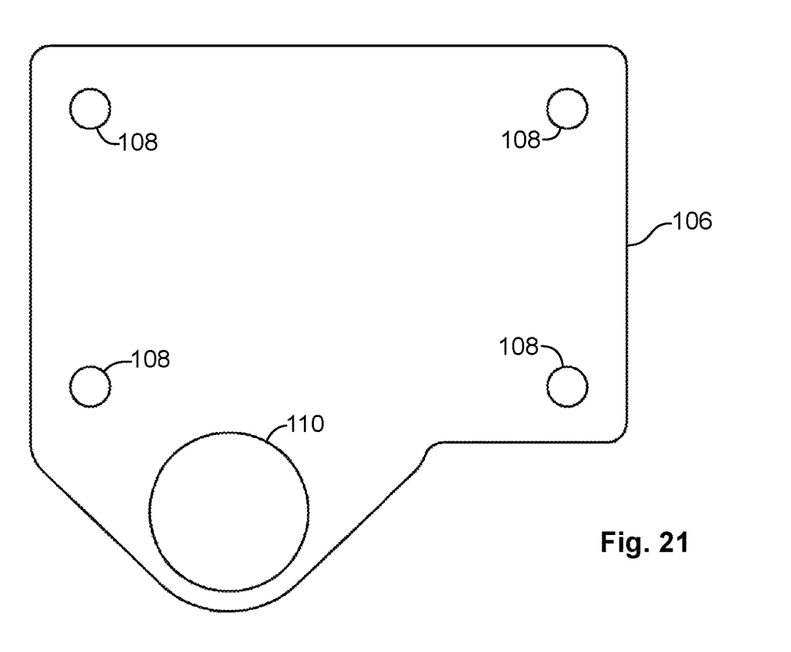
FIG. 21 is a top view drawing of a lockout base according to an illustrative embodiment of the present invention.
Figure 22:
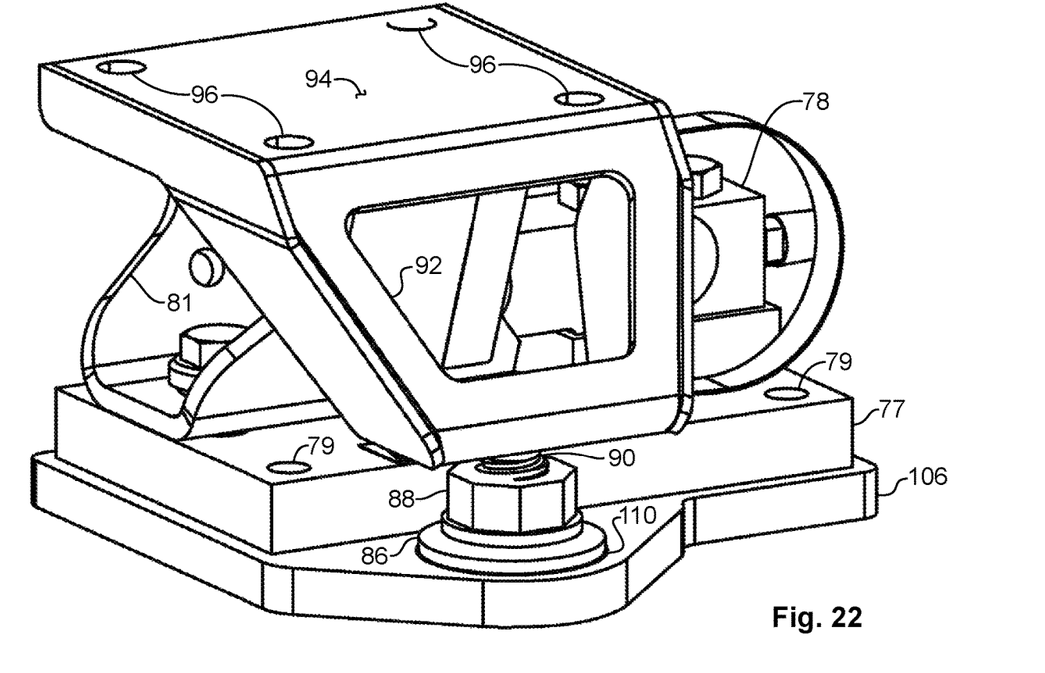
FIG. 22 is a perspective view drawing of a lockout assembly engaged with a weigh module according to an illustrative embodiment of the present invention.

Reference is directed to FIG. 21, which is a top view drawing of an alignment pad 106 according to an illustrative embodiment of the present invention. This alignment pad 106 comprises plural bolt holes 108 and an alignment pad recess 110 located off a second side of the alignment pad 106. Now reference FIG. 22, which is a perspective view drawing of a lockout assembly engaged with a weigh module 78 and positioned on the alignment pad 106 of FIG. 21. In FIG. 22, note that the weigh module 78 base plate 77 has plural bolt holes 79 that correspondingly align with the bolt holes 108 in the alignment pad 106. The flange spacer 94 is positioned on top of the weigh module 78, and includes plural bolt holes 96, as in the previously described embodiments. A jack arm 92 extends laterally and downwardly from the flange spacer 94, and has a jack screw 90 extending downwardly therefrom. A jack nut 88 threadably engages the jack screw 90, which is located in the recess 110 of the alignment pad 106. The weigh module 78 dead stand 81 can be seen under the flange spacer 94. With this arrangement, the lateral extension of the assembly can be located at either end of the weigh module 78.

Figure 23:
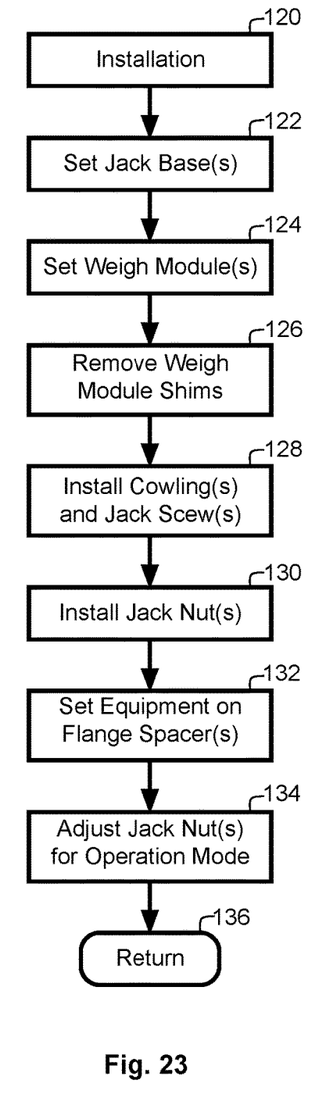
FIG. 23 is a process flow diagram according to an illustrative embodiment of the present invention.

Reference is directed to FIG. 23, which is a process flow diagram according to an illustrative embodiment of the present invention. This flow diagram illustrates the process of installing the lockout assembly(ies) and weigh module(s) of an illustrative embodiment. Installation begins at step 120 and proceeds to step 122 where the alignment pads are set in place. At step 124, the weigh modules are set in place, which may be directly on top of the alignment pads. At step 126, the factory shims and spacers are removed from the weigh modules. At step 128, the cowling and jack screw assemblies are installed on the weigh modules, and the jack nuts are also installed on the jack screws at step 130. At step 132, the equipment flanges are set in place on the flange spacers and the assembly is bolted together. At step 134, the jack nuts are adjusted for operational mode, and the process returns at step 136.

Figure 24:
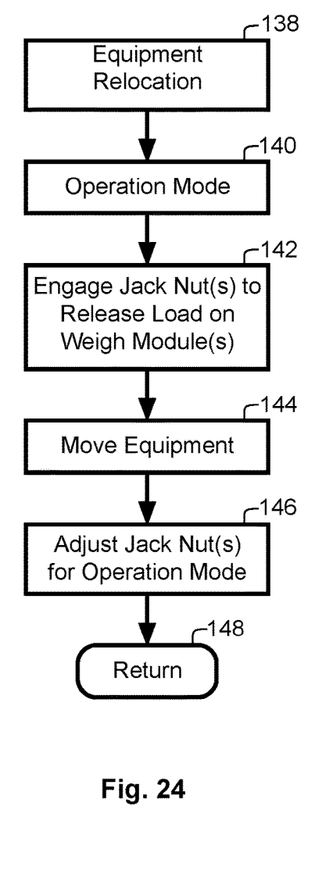
FIG. 24 is a process flow diagram according to an illustrative embodiment of the present invention.

Reference is directed to FIG. 24, which is a process flow diagram according to an illustrative embodiment of the present invention. This flow diagram illustrates the process of relocating equipment that has already been installed with lockout assemblies. The relocation begins at step 138 and proceeds to step 140, which is the operational mode. At step 142, the jack nuts are engaged with the jack pads or the alignment pads, as the case may be, and the load on the weigh modules is thereby reduced or eliminated. At step 144, the equipment may be safely moved. Once the move is complete, flow proceeds to step 146, where the jack nuts are disengaged and operational mode begins anew. The process returns at step 148.

Figure 25:
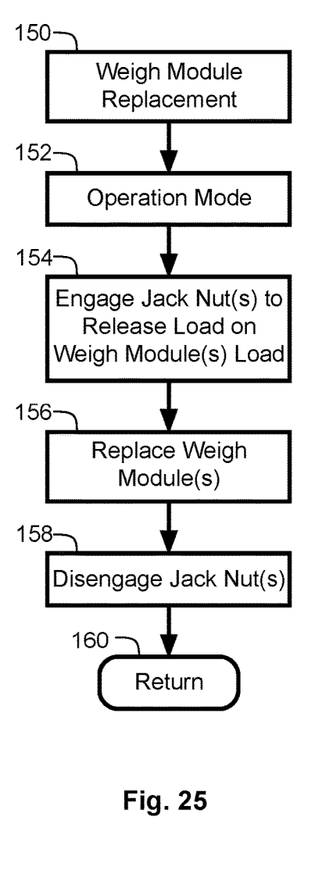
FIG. 25 is a process flow diagram according to an illustrative embodiment of the present invention.

Reference is directed to FIG. 25, which is a process flow diagram according to an illustrative embodiment of the present invention. This diagram illustrates the process of replacing or repairing the weigh modules. The replacement begins at step 150 and proceeds to step 152, which is the operational mode. At step 154, the jack nuts are engaged with the jack pads or the alignment pads, as the case may be, and the load on the weigh modules is thereby eliminated. At step 146, the weigh modules are replaced or repaired while the lockout assemblies support the equipment. Once complete, flow proceeds to step 158, where the jack nuts are disengaged and operational mode begins anew. The process returns at step 160.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A lockout assembly, for selectively limiting force applied to a weigh module, the weigh module having a top plate with a load cell disposed thereunder, which senses force applied to the top plate from an equipment flange, the weigh module supported by a support structure, the lockout assembly comprising;
    a cowling having a flange spacer configured for placement between the top plate and the equipment flange, and having a jack arm that extends laterally and downwardly therefrom;
    a jack screw extending downwardly from said jack arm adjacent to, but not engaging, the support structure;
    a jack nut threadably engaged with said jack screw, adjustable between a lockout position wherein said jack nut engages the support structure, and a weighing position wherein said jack nut does not engage the support structure, and wherein
    at said lockout position, a first portion of the force applied from the equipment flange is coupled through said cowling, said jack arm, said jack screw, and said jack nut, into the support structure, to thereby limit a second portion of the force coupled through the weigh module, and wherein
    at said weighing position, all of the force applied from the equipment flange is coupled through the weigh module.

2. The lockout assembly of claim 1, and wherein:
    said jack nut is configured with an enlarged lower surface area, as compared to a nominally sized nut suitable to engage said jack screw, to thereby decrease the load force per unit of area upon the support structure.

3. The lockout assembly of claim 1, and further comprising:
    an alignment pad disposed between said jack nut and the support structure, and having a jack nut alignment opening formed therein for receiving and aligning said jack nut.

4. The lockout assembly of claim 3, and wherein:
    said alignment pad extends underneath the weigh module to support the weigh module.

5. The lockout assembly of claim 4, and wherein:
    said jack nut alignment opening in said alignment pad is selectively positionable to enable said jack screw and said jack nut to be located about either side or either end of the weigh module.

6. The lockout assembly of claim 3, and further comprising:
    a jack washer disposed under said jack nut and within said jack nut alignment opening in said alignment pad.

7. The lockout assembly of claim 6, and wherein:
    said jack washer is fabricated from a polymeric material to provide improved lubricity during adjustment of said jack nut.

8. The lockout assembly of claim 1, and wherein:
    at said lockout position, said first portion of the force comprises all of the force applied to the top plate, to thereby enable removal of the weigh module while the equipment flange support is maintained.

9. The lockout assembly of claim 1, wherein the top plate and the equipment flange include plural correspondingly aligned bolt holes, and wherein:
    said flange spacer includes plural bolt holes correspondingly aligned with the top plate and the equipment flange, to thereby facilitate assembly thereof with plural bolts.

10. The lockout assembly of claim 1, wherein the weigh module includes a dead stand with anti lift-off bolt, and wherein:
    said jack arm extends laterally to locate said jack screw a sufficient distant to clear the dead stand and anti lift-off bolt.

11. The lockout assembly of claim 10, wherein an item of equipment includes at least three equipment flanges rigidly located with respect to one another, which require a corresponding plurality of aligned weigh modules, and further comprising:
    at least two additional lockout assemblies, all correspondingly aligned with the at least three equipment flanges, and wherein
    the rigidly located at least three equipment flanges accommodate offset load forces between centers of the plurality of weigh modules and corresponding plurality of jacks screws, which are laterally offset by the plurality of jack arms.

12. The weigh module of claim 1, and wherein:
    said cowling comprises a reinforcing flange formed about said flange spacer periphery, which joins with said jack arm, and wherein
    said jack arm is formed of three side surface joined with said reinforcing flange.

13. A method of selectively limiting force applied to a weigh module that has a top plate with a load cell disposed thereunder, and which is supported on a support structure, the weigh module for sensing force applied to the top plate from an equipment flange, using a lockout assembly that includes a cowling with a flange spacer portion, a jack arm extending laterally and downwardly from the cowling, and a jack screw extending downwardly from the jack arm, and a jack nut, the method comprising the steps of:

placing the flange spacer portion of the cowling between the top plate and the equipment flange, thereby aligning the jack screw adjacent the support structure, but not engaging the support structure;

threadably engaging the jack nut with the jack screw, and adjusting the jack nut between a lockout position by engaging the jack nut with the support structure, and a weighing position by disengaging the jack nut from the support structure and wherein at said lockout position, coupling a first portion of the force applied from the equipment flange through the cowling, the jack arm, the jack screw, and the jack nut, into the support structure, thereby coupling a limited a second portion of the force through the weigh module, and wherein at said weighing position, coupling all of the force applied from the equipment flange is through the weigh module.

14. The method of claim 13, further comprising the steps of:

applying all of the force from the equipment flange, at the lockout position, through the lockout assembly, thereby facilitating removal of the weigh module while maintaining support of the equipment flange.

15. The method of claim 13, wherein the top plate and the equipment flange include plural correspondingly aligned bolt holes, and further comprising the steps of:

connecting the flange spacer with the top plate and the equipment flange, having plural correspondingly aligned bolt holes formed therethrough, using plural bolt sets, thereby facilitating assembly thereof.

16. The method of claim 13, and wherein the jack nut is configured with an enlarged lower surface area, as compared to a nominally sized nut suitable to engage said jack screw, and further comprising the step of:

decreasing decrease the load force per unit of area upon the support structure using the jack nut with an enlarged lower surface area.

17. The method of claim 13, and further comprising the steps of:

disposing an alignment pad having a jack nut alignment opening formed therein between the jack nut and the support structure, and aligning and receiving the jack nut within the jack nut alignment opening.

18. The method of claim 17, and further comprising the steps of:

selectively positioning the jack nut alignment opening thereby enabling the jack screw and the jack nut to be position about either side or either end of the weigh module.

19. The method of claim 17, further comprising the steps of:

extending the alignment pad underneath the weigh module, thereby supporting the weigh module.

20. The method of claim 17, and further comprising the step of:

disposing a jack washer under the jack nut and within the jack nut alignment opening in the alignment pad.

* * * * *